United States Patent Office 2,876,211
Patented Mar. 3, 1959

2,876,211

COMPOSITIONS OF A COPOLYMER OF AN ALKOXYALKYL ALPHA-ALKYL ACRYLATE WITH ACROLEIN AND AN ORGANIC HEAVY METAL SALT DRIER

Martin E. Cupery, Wilmington, Del., assignor to E. I. du Pont de Nemours and Company, Wilmington, Del., a corporation of Delaware No Drawing. Application May 18, 1955
Serial No. 509,407

9 Claims. (Cl. 260—73)

This invention relates to new polymeric compositions and to their preparation. More particularly this invention relates to novel polymeric coating compositions and to their preparation.

Protective coating compositions based on drying oils, and similar unsaturated materials, depend upon oxidation to cure to insoluble films. Because these oxidations continue after insolubilization has occurred, gradual, but continous, degradation of the film takes place. This ultimately results in complete film failure. In general, compositions which show rapid curing therefore are also the least durable, particularly upon exposure to outdoor weathering.

It has long been an objective in the field of protective finishes to develop compositions which cure rapidly by an oxidative process to insoluble films, and then become essentially stable toward further oxidation, thus leading to high durability. Other requirements for such compositions, which are essential for practical use, are that the films rapidly become free of tackiness, have good hardness and color and that the compositions have high solubility in commercially available solvents. It is also essential that the films when cured become sufficiently inert toward the application of additional coatings of the same composition, so that there is no tendency of the previously applied coatings to dissolve or to wrinkle and lift. Furthermore, it is important that the cured compositions resist rapid degradation in the initial oxidative curing process, as is often indicated by a rapid decrease in their resistance to dilute aqueous alkali.

It is an object of this invention to provide new polymeric compositions and methods for their preparation. A further object is to provide new polymeric coating compositions and methods for their preparation. A further object is to provide new protective coating compositions which cure rapidly at ordinary temperatures and can be used in multi-coat systems without danger of wrinkling and lifting. A still further object is to provide new protective coating compositions which possess a unique combination of desirable properties. Another object is to provide coating compositions containing a polymer of an alkoxyalkyl alpha-alkyl acrylate which cure relatively rapidly on air-drying and give insoluble, durable, tough films. Other objects will appear hereinafter.

These and other objects of this invention are accomplished by providing compositions comprising polymerized unit of an alkoxyalkyl alpha-alkyl acrylate, an aldehyde containing more than two carbon atoms which is wholly hydrocarbon except for aldehyde oxygen, and a metal drier. One class of compositions of this type comprises a polymerized alkoxyalkyl alpha-alkyl acrylate, a non-polymerizable monomeric aldehyde, i. e., a monomeric aldehyde free of terminal aliphatic carbon to carbon unsaturation, boiling above 60° C. at atmospheric pressure and containing more than two carbon atoms which is wholly hydrocarbon except for aldehyde oxygen, and a metal drier, as disclosed and claimed in my copending application Ser. No. 749,607, filed July 21, 1958, as a division of this application. Another class of compositions of this type comprises a copolymer of an alkoxyalkyl alpha-alkyl acrylate with acrolein and a metal drier. Thus the aldehyde has a boiling point above 60° C. at atmospheric pressure when it is a non-polymerizable monomer and is acrolein and copolymerized with the alkoxyalkyl alpha-alkyl acrylate when it is polymerizable.

Coating compositions of the first type are prepared by adding to a solution of a polymer of an alkoxyalkyl alpha-alkyl acrylate in a volatile organic solvent a non-polymerizable monomeric aldehyde boiling above 60° C. at atmospheric pressure and containing more than two carbon atoms and which is wholly hydrocarbon except for the aldehyde oxygen, and a metal drier, and stirring until the blend is homogeneous. Coating compositions of the second type are made by adding a metal drier to a solution in a volatile organic solvent of a copolymer of an alkoxyalkyl alpha-alkyl acrylate with acrolein.

The compositions of this invention in volatile organic solvents are applied to flexible or rigid substrates by brushing, flowing, spraying, dipping or other methods known to the art, the solvent is permitted to evaporate, and the resulting film allowed to stand at ordinary temperatures. After 1 to 20 hours the film is cured and subsequent coats can be applied without danger of lifting or wrinkling.

The examples which follow are submitted to illustrate and not to limit this invention. Parts are by weight, unless otherwise specified.

EXAMPLE I

A methoxyethyl methacrylate homopolymer was prepared by heating at 75° C. for 2 hours and then at 85° C. for 2 hours, a solution comprising 72 parts of methoxyethyl methacrylate, 168 parts benzene, and 0.72 part benzoyl peroxide. The conversion of monomer to polymer was 97% of theory. The polymer was purified by precipitation with petroleum ether and washing twice, followed by dissolution in benzene and again precipitating with petroleum ether. The product was dissolved in benzene and placed under reduced pressure, with warming, to distill residual petroleum ether. The remaining solution at 36.4% solids had a viscosity of 1.32 poises.

Films obtained from air-drying a solution of the above homopolymer containing 5% added benzaldehyde and 0.02% added cobalt as cobalt naphthenate (based on polymer weight), became substantially insoluble in benzene and dioxane after 2 to 4 hours. After 8 to 12 hours air-drying, these films were completely insoluble in these solvents and swelled only slightly when contacted with these solvents. In comparison, films obtained from the above-described methoxyethyl methacrylate homopolymer containing only added drier remained soluble after air-drying for 2 to 4 weeks.

The cure aldehyde modified films had better hardness, better toughness, superior general film properties, and better durability than the non-cured control films. Superior durability, on outdoor exposure, of the aldehyde modified films on white pinewood panels is shown by the comparison in Table I below:

Table I

| | 14 Weeks | 19 Weeks | 26 Weeks |
|---|---|---|---|
| Methoxyethyl methacrylate homopolymer. | Fair | Cracking | Extensive cracking. |
| Methoxyethyl methacrylate homopolymer + cobalt naphthenate.[1] | Cracking | Extensive cracking. | Severe cracking. |
| Methoxyethyl methacrylate homopolymer + cobalt naphthenate + benzaldehyde.[2] | Excellent | Excellent | Excellent. |

[1] 0.02% cobalt on polymer.
[2] 5% benzaldehyde on polymer.

Identical procedures using ethoxyethyl methacrylate gave closely similar results. Thus the aldehyde modified ethoxyethyl methacrylate homopolymer, in the presence of metal drier, gave insoluble, cured films after air-drying for 8 to 12 hours. The control films from ethoxyethyl methacrylate without either added aldehyde or metal drier did not cure satisfactorily upon air-drying for 2 weeks. A composition containing methoxyethyl acrylate polymer and 0.02% cobalt as cobalt naphthenate, based on polymer weight, gave soft, tacky films which have low resistance to solvents and poor outdoor durability. Addition of benzaldehyde did not produce any significant differences in the curing or film properties.

EXAMPLE II

A solution comprising 22 parts of methoxyethyl methacrylate, 3 parts of acrolein, 58 parts of benzene and 0.25 part of bis-azodiisobutyronitrile catalyst was placed under a nitrogen atmosphere in a closed vessel and heated at 75° C. for 3 hours. The conversion of monomers to copolymer was 77% of theory. The copolymer was purified by precipitation with petroleum ether, twice washing with this solvent, dissolving the copolymer in benzene, and again precipitating and washing with petroleum ether. The copolymer was then dissolved in benzene and the solution placed under reduced pressure, with warming, to remove residual petroleum ether. The solution of purified copolymer at 42.7% solids in benzene had a viscosity of 0.75 poise. Analysis for carbonyl groups, by reaction with hydroxylamine hydrochloride in isopropyl alcohol solution and titration for liberated hydrogen chloride, indicated an acrolein content of 10.9% in the copolymer.

Films prepared from the above solution to which had been added a low amount of cobalt naphthenate (about 0.01% cobalt based on copolymer weight) cured to films which were insoluble in dioxane on air-drying for 8 to 12 hours. Identical films without added cobalt remained completely soluble in dioxane after air-drying 18 hours and showed slight insolubilization after about 72 hours.

The comparison films of methoxyethyl methacrylate homopolymer which had been prepared by the same procedures, with 0.02% cobalt added as cobalt naphthenate, required from 2 to 7 weeks air exposure before insolubilization became evident. Without added drier, films of the methoxyethyl methacrylate homopolymers did not cure and remained soluble in dioxane after exposure to air for periods of 4 weeks and longer.

Films of the above-described methoxyethyl methacrylate/acrolein copolymer/drier blend on air-drying were free from tackiness after one to two hours. After 24 hours such films had a hardness rating of about HB on the pencil hardness scale and were definitely harder than the control films which had a hardness of about B or less on the pencil hardness scale. The cured copolymer films were also superior in toughness and resistance to printing at 55° C. Additional coatings of the copolymer/drier blend could be applied over the cured films, with out lifting and wrinkling. Similar coatings applied over the uncured controls caused the initial coatings to dissolve so that application by brushing became difficult and unsatisfactory.

A composition similar to the above, except that the methoxyethyl methacrylate was replaced by methoxyethyl acrylate, gave films of methoxyethyl acrylate/acrolein copolymer which were soft, tacky, and which had poor solvent-resistance, low resistance to dilute aqueous alkali, and poor outdoor durability. Results were equally poor in the presence or absence of metal driers.

EXAMPLE III

The procedure of the above example was repeated using ethoxyethyl methacrylate as the comonomer with acrolein. The conversion to copolymer was 77% of theory and the product, after purification, contained 10.6% acrolein as determined by analysis. Films of this copolymer, with 0.02% cobalt as cobalt naphthenate, based on polymer, cured to insoluble films in 8 to 12 hours air-drying. Without drier, the films cured much slower. Films of unmodified ethoxyethyl methacrylate homopolymer without drier, did not cure in 4 weeks and with cobalt naphthenate added (0.02% cobalt on polymer) cured only slowly upon exposure to air for 3 to 4 weeks.

EXAMPLE IV

A copolymer was prepared by heating a solution comprising 27 parts of methoxyethyl methacrylate, 27 parts of methyl methacrylate, 6 parts of acrolein, 140 parts of benzene and 1.5 parts of bis-azodiisobutyronitrile, in a closed vessel under nitrogen atmosphere, at 75° C. for 2 hours and then at 85° C. for 2 hours. The conversion of monomers to copolymer was 97% of theory. The product after purification by the method of Example II had a viscosity in benzene of 0.62 poise at 42% solids. Analysis for aldehyde content indicated that the copolymer contained 8.1% acrolein.

Films of the product, containing 0.02% added cobalt as cobalt naphthenate, based on polymer, were insoluble in dioxane and xylene after air-drying for about 20 hours. Such films showed no tackiness, had excellent toughness and flexibility, and a hardness of HB to H on the pencil hardness scale. Such films were only slightly softened but showed no degradation or other change upon immersion for 4 hours in water or in 1% aqueous sodium carbonate solution. Coatings placed over steel, primed steel and wood surface showed high durability upon exposure to outdoor weather conditions.

EXAMPLE V

The effect of varying concentrations of benzaldehyde on the rate of curing of a methoxyethyl methacrylate polymer containing 0.05% cobalt naphthenate is shown in Table II below:

*Table II*

| Percent Benzaldehyde based on polymer weight | Hrs. air-drying for 2 mils thick films to become insoluble in dioxane |
| --- | --- |
| None | 400+. |
| 2 | 200. |
| 4 | 10. |
| 5 | 2 to 4. |
| 10 | less than 2. |
| 20 | less than 2. |

Other metal driers, such as cobalt acetate, cobalt oleate, and nickel (butyl acetoacetate) gave results closely similar to cobalt naphthenate in the above tests. Copper acetate and manganese acetate also showed an effective drier action.

In the above tests the benzaldehyde could be replaced by other aldehydes such as 2-ethylhexanal, cinnamaldehyde, n-butyraldehyde, crotonaldehyde, and the like, while furfural and formaldehyde were ineffective in promoting the curing.

Greater than 20% of aldehyde is not desirable because excessive softening of the film occurs and such compositions have rather strong aldehydic odors. Concentrations below about 2% do not afford adequate curing.

EXAMPLE VI

An aqueous emulsion of a copolymer of methoxyethyl methacrylate and acrolein was prepared by heating at 65° C. for about 16 hours an emulsified composition comprising 174 parts of water, 0.3 part of a tetrapropylenebenzene hydrocarbon sulfonate dispersing agent containing 30% of the sulfonate, 66 parts of methoxyethyl methacrylate, 9 parts of acrolein and 0.75 part of ammonium persulfate. A small amount of coagulated polymer was removed by straining through three layers of cheese cloth. The strained emulsion on air-drying formed transparent, tack-free films which had good strength and toughness but which were soluble in dioxane. The conversion of monomers was 94% of theory. In the presence of 0.05% added cobalt acetate based on polymer weight, such compositions on air-drying cured to insoluble films.

EXAMPLE VII

A copolymer of styrene and methoxyethyl methacrylate was prepared by heating at 85° C. for 4 hours a solution comprising 25 parts of styrene, 25 parts of methoxyethyl methacrylate, 116 parts of benzene, and 0.5 part of benzoyl peroxide. The conversion of monomers to polymer was 62% of theory. After purification by the method of Example I, the copolymer at 42.4% solids in benzene had a viscosity of 1.4 poises. Films of the copolymer containing cobalt naphthenate drier (0.02% cobalt copolymer) remained soluble in dioxane and xylene after exposure to air for one week while similar compositions containing also 5% of added benzaldehyde, based on copolymer weight, were insoluble in these solvents after exposure to air for periods of less than 24 hours.

EXAMPLE VIII

A tertiary butoxyethyl methacrylate homopolymer was prepared by heating at 75° C. for 2 hours and then at 85° C. for 2 hours, a solution comprising 27 parts of tertiary butoxyethyl methacrylate, 63 parts of benzene, and 0.27 part of benzoyl peroxide. The conversion to polymer was nearly 100% of theory. The solution, after heating, had a viscosity of 0.35 poise at 25° C. After evaporation under reduced pressure, the polymer was purified by the procedure of Example I. A solution of the purified polymer in benzene at 33.8% solids had a viscosity of 1.0 poise.

Films, obtained upon air-drying a solution of the above homopolymer containing 0.02% cobalt naphthenate, based on polymer, did not cure, even after several days aging at room temperature. However, the same composition to which was added 5% benzaldehyde, based on polymer gave films which were insoluble in dioxane, benzene and other solvents, after air-drying for 17 hours.

Similar curing effects, as described above, were obtained by addition of benzaldehyde to compositions containing driers and the homopolymer of 1-methyl-2-methoxy-ethyl methacrylate, or 2-isopropoxyethyl methacrylate.

The alkoxyalkyl alpha-alkyl acrylates of the compositions of this invention are the esters of alpha-alkyl substituted acrylic acids, particularly those containing from 1 to 6 carbon atoms in the alpha-alkyl group, especially alpha-methyl acrylic acid, with ether monohydric alcohols, particularly those containing from 3 to 8, and preferably 3 to 4, carbon atoms in the alkoxy-alkyl group. Alkoxyethyl alpha-alkyl acrylates are especially preferred, particularly those having 1 to 4 carbon atoms in the alkoxy group of which the alkoxyethyl alpha-methyl acrylates are most preferred.

Specific examples of ether alcohols of the above kind are ethylene glycol monoethyl ether, ethylene glycol monopropyl ether, propylene glycol monoethyl ether, tetramethylene glycol monobutyl ether, pentamethylene glycol monoethyl ether, ethylene glycol monopentyl ether, 2,3-diethoxy-1-hydroxypropane, 1,3-dimethoxy-2-hydroxypropane, and the like.

Examples of alpha-alkyl substituted acrylic acids are alpha-methyl acrylic, alpha-ethyl acrylic, alpha-hexyl acrylic, and the like. Alpha-methyl acrylic is the preferred acid because it is available at relatively low cost, easily polymerized, and because films prepared with it have generally better properties than those obtained with any other alpha-alkyl substituted acrylic acid.

These alkoxyalkyl alpha-alkyl substituted acrylates are conveniently made as described in U. S. Patent 2,129,694, issued to E. F. Izard on September 13, 1938. Other methods may, of course, be employed for the preparation of these alkoxyalkyl alpha-alkyl substituted acrylates; for example, such as described in U. S. Patents 2,129,666 and 2,129,667, or by any of the well known esterification or ester interchange methods.

The alkoxyalkyl alpha-alkyl substituted acrylates obtained by the methods described in the examples and in the above patents are monomeric and they can be polymerized or copolymerized with acrolein by means of light, heat, and/or a catalyst, such as, a peroxy or an azo compound.

The polymerization may be effected in the presence or absence of a solvent for both monomer or polymer or in the presence of a solvent for the monomer or a nonsolvent for the polymer, or the monomer may be emulsified and then polymerized. Preferably polymerization is carried out at 60 to 100° C., although higher temperatures, e. g., 130° C. or higher may be employed. As a rule the polymerization is permitted to proceed until the resulting polymer has a molecular weight between 2500 and 5000 because polymers in this range possess the best combination of solubility characteristics and film properties. Polymers of very low molecular weight (below about 1000) do not cure satisfactorily either as copolymers with acrolein, or as homopolymers containing added aldehyde.

The aldehyde blended with the alkoxyalkyl alpha-alkyl acrylate component of the compositions of this invention may be an aromatic, alicyclic, or acyclic aldehyde containing more than 2 carbon atoms, which is wholly hydrocarbon, except for aldehyde oxygen, and which has a boiling point at atmospheric pressure of at least 60° C. Examples of such monomeric aldehydes, containing more than 2 and up to 18 carbon atoms, which are non-polymerizable, i. e., free of terminal aliphatic carbon to carbon unsaturation, are n-butyraldehyde, isobutyraldehyde, methylethylacetaldehyde, trimethylacetaldehyde, caproaldehyde, hendecanal, cyclopentanecarboxaldehyde, nonanal, 7-methyloctanal, tetradecanal, octadecanal, benzaldehyde, phenylacetaldehyde, 1-tolualdehyde, 3-phenyl-2-methylpropanal, 2,4,6-trimethylbenzaldehyde, 1-naphthaldehyde, succinaldehyde, adipaldehyde, pthalaldehyde, terethaldehyde, decanal, 2-methyl-2-butenal, 3-hexenal, 4-octenal, 2-nonenal, cinnamaldehyde, alpha - ethyl cinnamaldehyde, 1 - formylbicyclo-[2.2.1]-heptane, and the like.

The amount of aldehyde which is added to the alkoxyalkyl alpha-alkyl substituted acrylate-drier combination will be between about 2 and about 20%, preferably not more than 15%, by weight of the acrylate component. Because the best combination of film properties with speed of insolubilization is obtained using between 3 and 8% aldehyde by weight of the alkoxyalkyl alpha-alkyl acrylate component, this constitutes the amount generally employed.

The driers used are the heavy metal salts of long chain fatty acids, resin acids, and naphthenic acids. Examples of these organic heavy metal salt driers are cobalt linoleate, nickel rosinate, iron naphthenate, manganese linoleate, copper ricinoleate, cobalt oleate, and the like. In some cases simple salts, such as cobalt acetate and copper acetate, are effective as driers.

The amount of drier used will generally be between 0.005 and 0.1% by weight of the alkoxyalkyl alpha-alkyl substituted acrylate component of the composition. When the aldehyde content is high (about 8 to 15%) effective curing will occur, but at a much slower rate, in the absence of metal driers.

The alkoxyalkyl alpha-alkyl acrylate/acrolein copolymers will generally contain from about 2 to about 20 and preferably not more than 15 parts of the acrolein component. These copolymers are conveniently made by the method described in U. S. Patent 2,657,192.

In general the amount of reaction medium is selected to give solution of polymer or of copolymer containing from 25 to 45% solids. Suitable media are the aliphatic and aromatic hydrocarbons, alcohols, ketones, ethers, esters, and the like, or in water when emulsions are prepared.

The blend of the polymerized esters with a drier and an aldehyde, as well as of the copolymers thereof with acrolein and a drier, are highly useful as protective coatings. They are unique in yielding hard coatings which are insoluble in solvents for the polymerized esters and for the copolymers upon removal of solvent and exposure of the film to air at ordinary temperatures for from about one hour to 20 hours. The curing of these films may be accelerated by heat-treatment at temperatures of 60 to 100° C.

The ability of these films to cure rapidly at ordinary temperatures makes it possible to use them in multi-coat systems without danger of lifting of the first coat or of wrinkling. These compositions have exceptionally good durability as finishes over various substrates, such as, wood, steel, etc.

The blends of the polymerized esters with a drier and an aldehyde, and the blends of the copolymers with acrolein and a drier can be pigmented and modified by copolymerization with minor amounts, e. g., 10 to 20% by weight, of other vinyl monomers, or by blending with resins and drying and semi-drying oils to produce coatings for rigid and non-rigid substrates, e. g., paper, leather, and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition comprising a copolymer of an alkoxyalkyl alpha-alkyl acrylate with acrolein in amount from 2 to 20% by weight of the alkoxyalkyl alpha-alkyl acrylate component of said copolymer, and an organic heavy metal salt drier in amount of 0.005 to 0.1% by weight of the alkoxyalkyl alpha-alkyl acrylate component of said copolymer.

2. A composition comprising a copolymer of an alkoxyethyl alpha-methyl acrylate having from 1 to 4 carbon atoms in the alkoxy group with acrolein in amount from 2 to 20% by weight of the alkoxyethyl alpha-methyl acrylate component of said copolymer, and an organic heavy metal salt drier in amount of 0.005 to 0.1% by weight of the alkoxyethyl alpha-methyl acrylate component of said copolymer.

3. A composition as set forth in claim 1 wherein said organic heavy metal salt drier is cobalt naphthenate.

4. A composition as set forth in claim 1 wherein said organic heavy metal salt drier is cobalt acetate.

5. A composition comprising a copolymer of methoxyethyl methacrylate with acrolein in amount from 2 to 20% by weight of the methoxyethyl methacrylate component of said copolymer, and an organic heavy metal salt drier in amount of 0.005 to 0.1% by weight of the methoxyethyl methacrylate component of said copolymer.

6. A composition comprising a copolymer of methoxyethyl methacrylate with acrolein in amount from 2 to 20% by weight of the methoxyethyl methacrylate component of said copolymer, and an organic heavy metal salt drier consisting of cobalt naphthenate in amount of 0.005 to 0.1% by weight of the methoxyethyl methacrylate component of said copolymer.

7. A composition comprising a copolymer of methoxyethyl methacrylate with acrolein in amount from 2 to 20% by weight of the methoxyethyl methacrylate component of said copolymer, and an organic heavy metal salt drier consisting of cobalt acetate in amount of 0.005 to 0.1% by weight of the methoxyethyl methacrylate component of said copolymer.

8. A composition comprising a copolymer of ethoxyethyl methacrylate with acrolein in amount from 2 to 20% by weight of the ethoxyethyl methacrylate component of said copolymer, and an organic heavy metal salt drier in amount of 0.005 to 0.1% by weight of the ethoxyethyl methacrylate component of said copolymer.

9. A composition comprising a copolymer of ethoxyethyl methacrylate with acrolein in amount from 2 to 20% by weight of the ethoxyethyl methacrylate component of said copolymer, and an organic heavy metal salt drier consisting of cobalt naphthenate in amount of 0.005 to 0.1% by weight of the ethoxyethyl methacrylate component of said copolymer.

References Cited in the file of this patent

UNITED STATES PATENTS

| Number | Name | Date |
|---|---|---|
| 2,129,478 | Rohm | Sept. 6, 1938 |
| 2,129,694 | Izard | Sept. 13, 1938 |
| 2,413,294 | Curtis | Dec. 31, 1946 |
| 2,657,192 | Miller et al. | Oct. 27, 1953 |